(12) United States Patent
Kerr

(10) Patent No.: US 11,811,289 B2
(45) Date of Patent: *Nov. 7, 2023

(54) OCEAN CURRENT AND TIDAL POWER ELECTRIC GENERATOR

(71) Applicant: Colin Kerr, Halifax (CA)

(72) Inventor: Colin Kerr, Halifax (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/751,582

(22) Filed: May 23, 2022

(65) Prior Publication Data

US 2022/0360158 A1 Nov. 10, 2022

Related U.S. Application Data

(63) Continuation of application No. 16/478,105, filed as application No. PCT/US2018/013929 on Jan. 16, 2018, now Pat. No. 11,342,829.

(60) Provisional application No. 62/446,439, filed on Jan. 15, 2017.

(51) Int. Cl.
*H02K 44/08* (2006.01)
*H02K 44/10* (2006.01)
*F03B 13/12* (2006.01)
*H02K 44/12* (2006.01)
*H02K 44/16* (2006.01)

(52) U.S. Cl.
CPC .......... *H02K 44/085* (2013.01); *F03B 13/12* (2013.01); *H02K 44/10* (2013.01); *H02K 44/12* (2013.01); *H02K 44/16* (2013.01)

(58) Field of Classification Search
CPC ........ F03B 13/12; H02K 44/16; H02K 44/12; H02K 44/10; H02K 44/08; H02K 44/085; H02K 44/00; H02K 44/04
See application file for complete search history.

(56) References Cited

U.S. PATENT DOCUMENTS

| 3,102,224 | A | * | 8/1963 | Maeder | .................. | H02K 44/26 310/11 |
| 3,260,867 | A | * | 7/1966 | Hurwitz, Jr. | ........... | H02K 44/08 310/11 |
| 3,356,872 | A | * | 12/1967 | Woodson | ............... | H02K 44/18 310/11 |
| 4,151,423 | A | | 4/1979 | Hendel | | |

(Continued)

FOREIGN PATENT DOCUMENTS

| CN | 105606901 A | 5/2016 |
| GB | 2 395 369 A | 5/2004 |
| TW | 201406012 A | 2/2014 |

OTHER PUBLICATIONS

International Search Report and Written Opinion issued in International Application No. PCT/US18/13929 dated Jul. 19, 2018, 6 pages.

(Continued)

*Primary Examiner* — Tran N Nguyen
(74) *Attorney, Agent, or Firm* — Mauriel Kapouytian Woods LLP; Michael Mauriel

(57) ABSTRACT

Embodiments of an apparatus for generating electric power from flowing seawater are disclosed. Embodiments form fluid channels having magnetic fields through which seawater will flow. Electrodes are arranged with respect to the fluid channels and connected together such that electric power is generated as seawater flows through the channels.

10 Claims, 5 Drawing Sheets

(56) References Cited

U.S. PATENT DOCUMENTS

| | | | |
|---|---|---|---|
| 4,687,418 | A | 8/1987 | Gotou et al. |
| 4,851,722 | A | 7/1989 | Zauderer |
| 4,906,877 | A | 3/1990 | Ciaio |
| 5,003,517 | A | 3/1991 | Greer, Jr. |
| 5,136,173 | A | 8/1992 | Rynne |
| 5,668,420 | A | 9/1997 | Lin et al. |
| 6,168,882 | B1 | 1/2001 | Inoue et al. |
| 6,310,406 | B1 | 10/2001 | Van Berkel |
| 6,656,628 | B2 | 12/2003 | Chang et al. |
| 6,662,742 | B2 | 12/2003 | Shelton et al. |
| 7,166,927 | B2 | 1/2007 | Koslover et al. |
| 7,919,878 | B2 | 4/2011 | Peralta |
| 8,291,701 | B2 | 10/2012 | Papadopoulos |
| 11,342,829 | B2 * | 5/2022 | Kerr .................. H02K 44/085 |
| 2003/0001439 | A1 | 1/2003 | Schur |

OTHER PUBLICATIONS

Takeda, "Seawater Magnetohydrodynamics Power / Hydrogen Generator," Advances in Science and Technology, vol. 75, Oct. 27, 2010, pp. 208-214.

\* cited by examiner

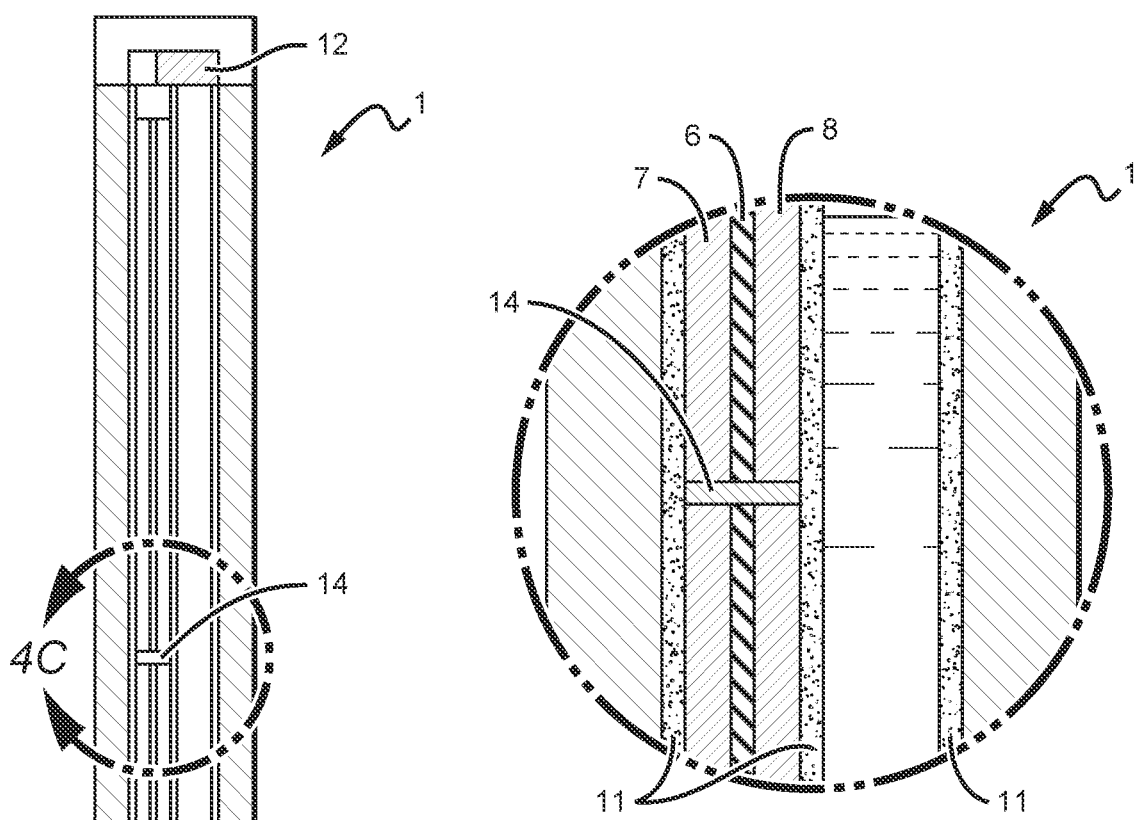
FIG. 4B
FIG. 4C
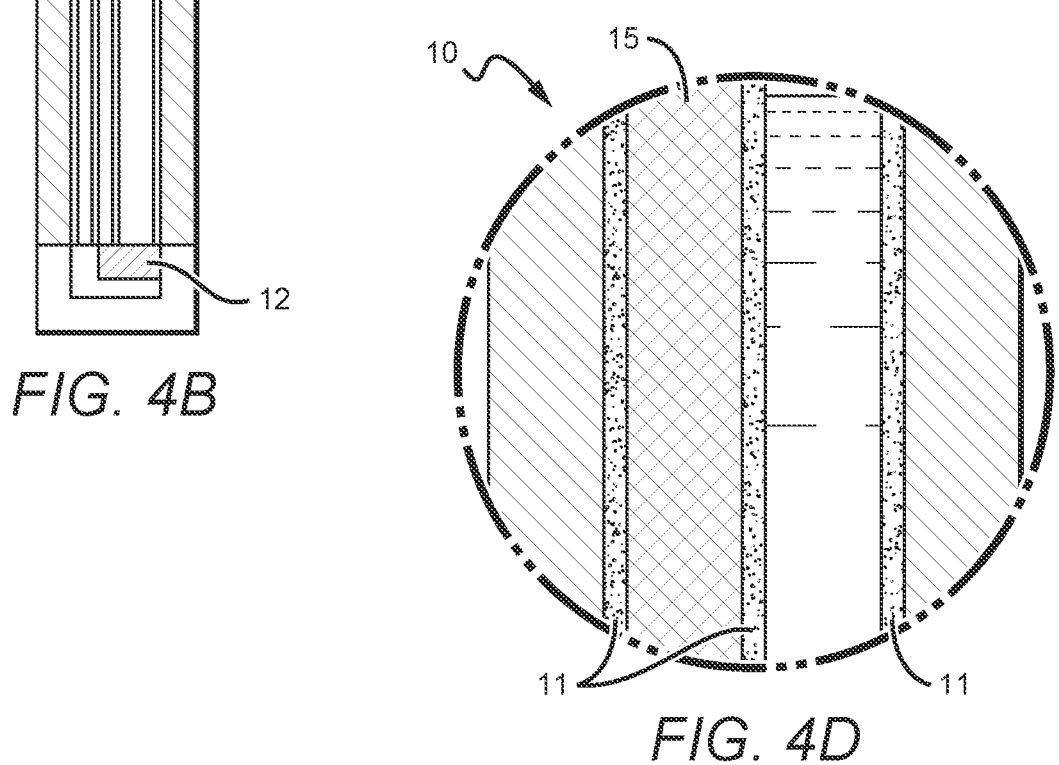
FIG. 4D

OCEAN CURRENT AND TIDAL POWER ELECTRIC GENERATOR

CROSS-REFERENCE TO RELATED APPLICATIONS

This application is a continuation of application Ser. No. 16/478,105 filed on Jul. 15, 2019, which is a U.S. National Phase Application of International Application No. PCT/US2018/013929 filed on Jan. 16, 2018, which claims priority to U.S. Provisional Application No. 62/446,439 filed on Jan. 15, 2017. The entire content of these applications are hereby incorporated by reference in their entirety.

BACKGROUND

Seawater is an electrically conductive saline solution. A column of seawater moving through a magnetic field therefore exhibits an electrical potential between its ends, and if the column ends are connected to an electrical load, current will flow around the resulting circuit.

A nonconductive magnetic grid creating a series of such columns in moving seawater, i.e. a tidal flow or ocean current, the columns interconnected in series or in parallel, could generate considerable power from the motion of the seawater, with no effect on the seawater other than imposing a drag force proportional to the amount of energy extracted from the flow.

The underlying principle was first demonstrated in 1832 by Michael Faraday in London, by measuring the current in the Thames using the effect of the earth's magnetic field on the salt water. In the present day, plasmas (which can behave as fluids) are used to generate electricity, known as magnetohydrodynamic generators.

BRIEF DESCRIPTION OF THE DRAWINGS

FIG. 4B is a front view of the embodiment of FIG. 4A

FIG. 4C shows further front-view details from a portion of the view in FIG. 4B.

FIG. 4D is a detailed front view portion of a channel unit which is an alternative embodiment having a permanent magnet.

DETAILED DESCRIPTION OF THE EMBODIMENTS

Embodiments of the invention employ a grid of powerful magnets and flow channels to directly extract electrical energy from tidal flows, or ocean currents, using no moving parts.

Figure 1:
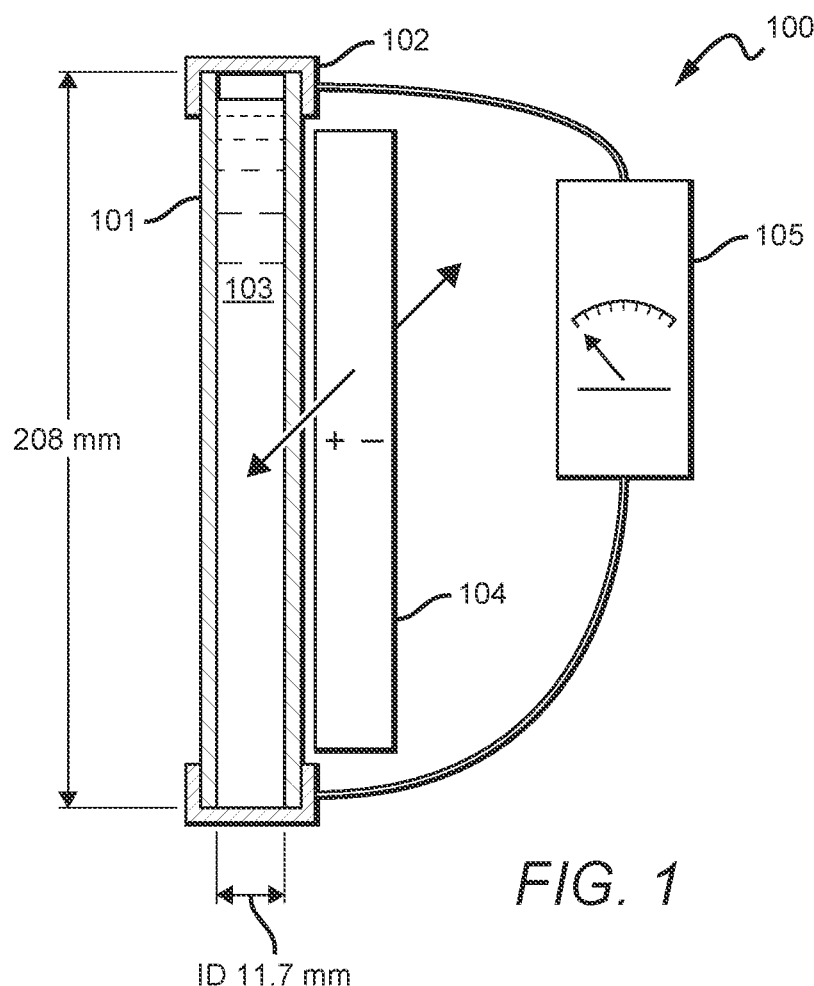
FIG. 1 shows a test embodiment that was utilized to demonstrate relevant principles applicable to the invention.

FIG. 1 shows a test embodiment 100 that was utilized to demonstrate relevant principles applicable to the invention. The referenced dimensions simply describe those of the test embodiment and are noted for completeness, but they do not represent a preferred embodiment of the invention. A tube 101 of seawater 103 was covered at each end by conductive end caps 102. Wires were connected from each of the conductive end caps 102 to an ammeter 105. Tube 101 had an inner diameter of 11.7 millimeters and a height of 208 millimeters. The following applies:

1. Conductivity of Seawater
   For seawater of salinity 35 g/kg at 20 C, conductivity=4.8 S·m$^{-1}$ (Siemens per meter).
2. Resistivity of Seawater
   Resistivity is the inverse of conductivity: $\rho=1/4.8=0.208$ Ω-m (ohm-meter)
3. Resistance of Seawater in Test Unit.
   Resistance of sample $$R = \rho \frac{L}{A}$$

where L=length of sample L=208 mm=0.208 m and A=area of sample in meters$^2$ where r=11.7/2=5.85 mm=5.85×10$^{-3}$ m.

$$A=\pi r^2=\pi(5.85\times10^{-3})^2=1.074\times10^{-4} \text{ m}^2$$

$$R=403\pi$$

4. Measured sample output current=0.1-0.4 amperes range. Using the lower value,
5. Power generated P=I$^2$R=0.1$^2$×403=4 watts As shown in FIG. 1, moving the magnet 104 past the tube 101 of seawater 103 caused a current to flow through a dc ammeter 105 connected between the conductive end caps.

Moving the magnet 104 at a speed of approximately 0.1 m/sec resulted in a measured current varying between 0.1 and 0.4 amperes, the variation probably being due to the varying distance between the magnet 104 and the tube 101.

This test unit is to demonstrate the principle only of power generation from the motion of seawater through a magnetic field. Its efficiency is low due to the absence of a complete magnetic circuit and to a relatively large air gap between the magnet and the electrolyte.

Using an electromagnet for excitation instead of a permanent magnet, the unit can be configured to deliver synchronized alternating current.

A full scale operational embodiment has at least the following applications—

1. Power generation—dc, or ac as required—from tidal flows (bidirectional) and ocean currents.

2. Power supply (instrumentation and data transmission) for remote monitoring stations—tidal or ocean current profiles and other parameters—temperature, salinity, etc.

Certain embodiments of the invention consequently offers advantages over any existing tidal or ocean current generators, the majority of which make use of rotating turbines of some kind. Some embodiments provide one or more of the following advantages: Lower capital cost; long service life underwater—no submerged moving parts; low maintenance costs; bidirectional—usable for all tidal power applications; reliability—ideal for remote mid-ocean monitoring and telecom applications; works efficiently at various flow rates; little or no effect on marine life—magnetic fields are entirely internal.

Embodiments of the invention generate electricity directly from seawater flows—tidal streams and ocean currents. This power generation technology operates on the principles of magnetohydrodynamics, and functions in seawater.

The recently-recognized, but potentially very large, market for ocean energy is much better served by embodiments of the invention than by adaptation of existing turbine generators.

Figure 2:
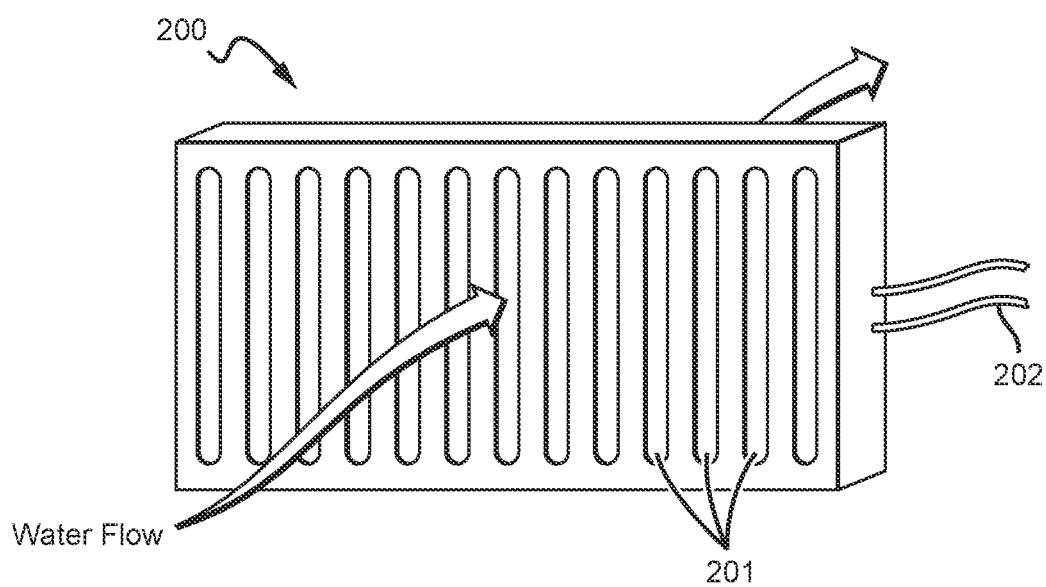
FIG. 2 provides an overview of a module consistent with one embodiment of the invention.

FIG. 2 provides an overview of a module 200 consistent with one embodiment of the invention. Seawater flows straight through the illustrated module past channels 201 through a magnetic grid provided by module 200. The kinetic energy of the flowing water is converted to electricity as the ionized dissolved salts in the seawater pass through magnetic fields, causing current to flow between electrodes positioned at the top and bottom of channels 201.

Figure 3:
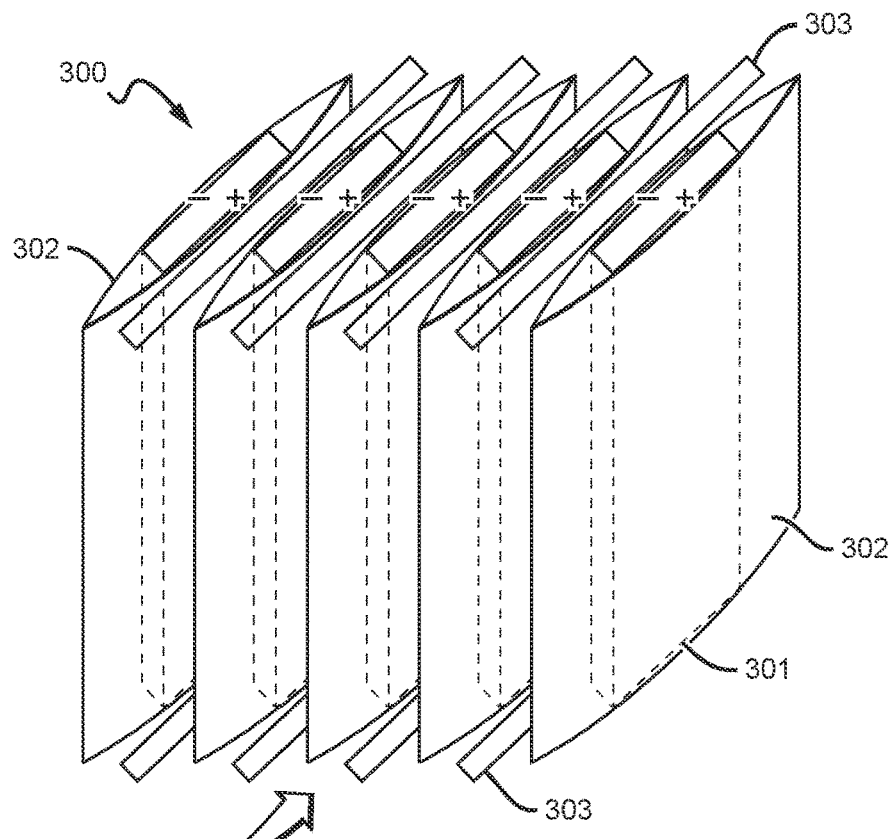
FIG. 3 shows an exemplary module consistent with one embodiment of the invention and illustrates further details of an exemplary module.

FIG. 3 shows an exemplary module 300 consistent with one embodiment of the invention and illustrates further details of an exemplary module. It shows five channel units 302 arranged to create four flow channels. Each channel unit 302 comprises a magnet 301, a negative pole side of one magnet facing a positive pole side of another magnet as shown. Preferably, non-corroding electrodes 303 are molded into the base and cover of each channel unit 302. The electrodes 303 can be connected in series for higher voltage or in parallel for higher current. The shape of channels provided between each channel unit is designed to provide a venturi between magnets 301, i.e., be narrower between the magnets 301 than elsewhere, thereby increasing flow velocity between the magnets 301.

FIGS. 4-8 further illustrate embodiments of the inventive power generator for the conversion of tidal flows or ocean currents into electricity. The illustrated embodiments preferably do not have moving parts and preferably have protection from interference from particles or debris suspended in the flowing water.

Two versions of the device are described. The first version employs permanent magnets and the second employs electromagnets to induce electric current from saline water flow. The electromagnetic model is intended for applications in which ferrous or magnetic particles may be suspended in the water flow, which particles could adhere to the magnets and accumulate, thereby causing flow constriction, or where an alternating current output may be preferable to direct current.

Embodiments of the invention range in size from a miniature single channel unit for very low power applications, through multichannel modules for medium power applications, to high power multi-module arrays for utility-scale power generation.

Embodiments of the invention preferably generate power at any water speed, in both directions. Preferably, there is no startup or shutdown water speed.

Figure 4A:
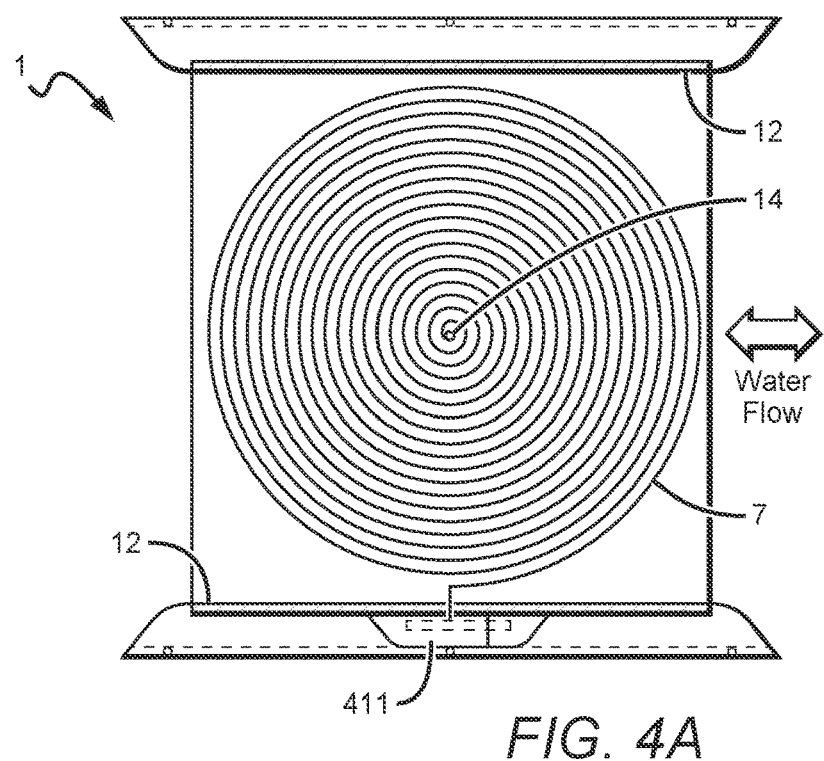
FIG. 4A is a side view illustrating an electromagnet-based channel unit consistent with an embodiment of the invention.

FIGS. 4A (side view), 4B (front view) and 4C (showing further front-view details from a portion of the view in FIG. 4B) illustrate electromagnet-based channel unit 1 in an embodiment of the invention. Channel unit 1 is a unit that could be used within a module comprising an array of such units such as, for example, module 500 of FIG. 5 (further described below). FIG. 4A illustrates the side view of the channel-unit 1 and shows spiral insulated copper coil 7, which one of two identical flat spiral insulated copper coils 7 and 8 shown in FIG. 4C. As shown in FIG. 4C (detail of a front view portion) spiral coils 7 and 8 are separated by a thin insulating layer 6. The two coils are connected by a conductive rod 14 passing through the center of the coil through the insulating sheet 6 to the adjoining coil. The outer ends of each coil are connected to an open-ended cylinder in the power takeoff receptacle 411 mounted under the channel unit. Power takeoff receptacle 411 is shown in further detail in FIG. 6. The entire outer surfaces of the channel unit is encapsulated in a saline-resistant polymer material except the electrodes 12, which are also connected by embedded copper conductors to the power takeoff receptacle 411. The electrodes 12 may be continuous across the length of the channel unit, or may be segmented to provide multiple conductive paths within the channel unit.

FIG. 4D is a detailed front view portion of a channel unit 10, which is a permanent magnet alternative embodiment. Rather than having coils for an electromagnet, the embodiment illustrated in FIG. 4D comprises a single flat-plate permanent magnet 15 surrounded by a layer of encapsulating material 11. The flat-plate permanent magnet 15 may be made up of a number of smaller elements, to employ powerful rare-earth magnet segments to make up a thin rectangular plate.

Figure 5:
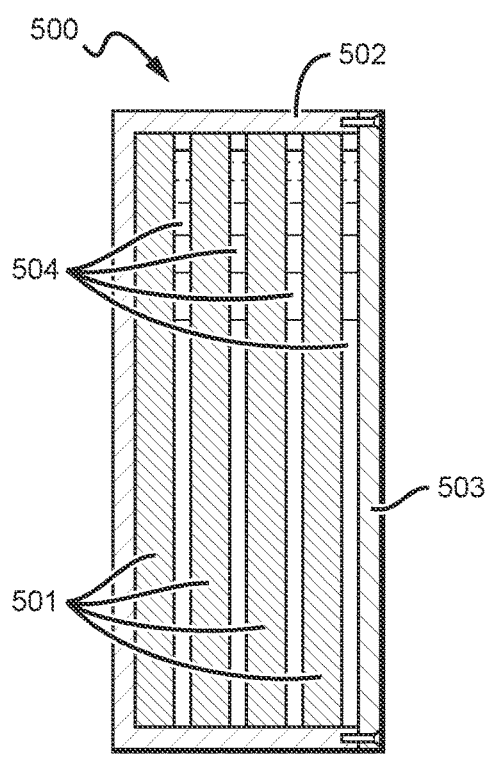
FIG. 5 illustrates a module consistent with an embodiment of the invention.

FIG. 5 illustrates a module 500, consistent with an embodiment of the invention, which in this instance contains four channel units 501. There can be any number of channel units in a module, but preferably within the following limitation: the width of the module should be such that the module is not exposed to significant water shear, e.g., not exposed to water shear amounts that are sufficient to cause significantly varying water speeds across the width of the module. The channel units 501 are placed within the frame 502 and are compressed by securing the frame cap 503, resulting in watertight contacts between the encapsulated channel units. The elements of module 500 are arranged to form four water channels 504 through which seawater may flow.

Figure 7A:
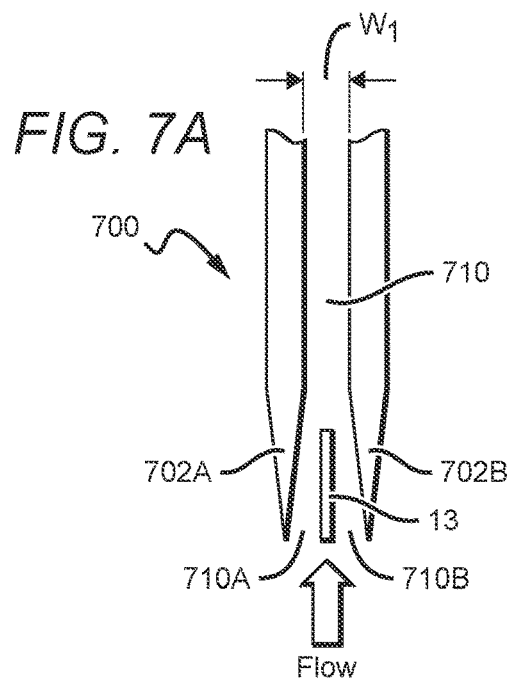
FIG. 7A illustrates a top view of a portion of a channel unit consistent with an embodiment of the present invention.
Figure 6:
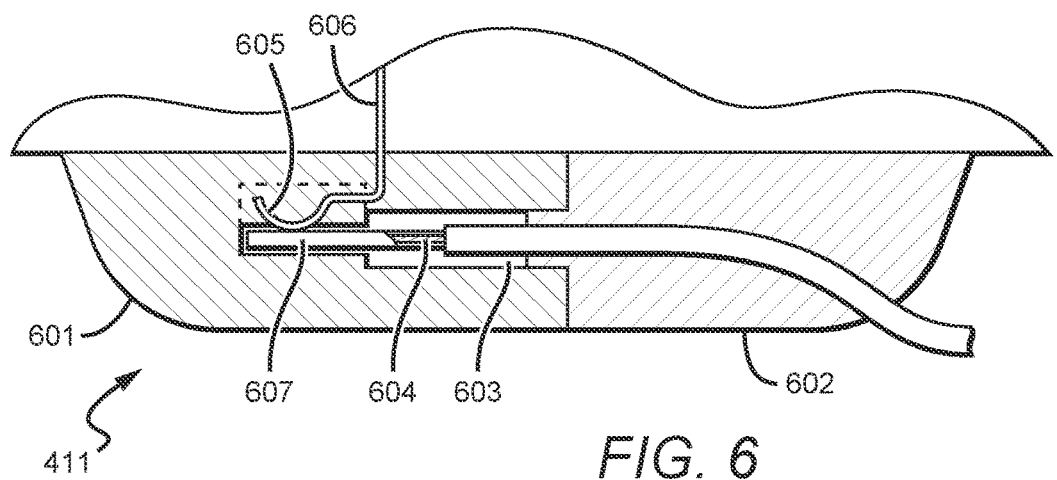
FIG. 6 illustrates the pressure-seal plug and receptacle shown in FIG. 4A.

FIG. 6 illustrates the pressure-seal plug and receptacle 411 described above. The corresponding power takeoff plug consists of conductive rod 607 holding a pressure contact 605 (which might be, for example, a phosphor bronze or similar loop), which is sprung against the inside of the cylindrical space in which conductive rod 607 fits, to make a secure electrical contact. The loop is terminated by a waterproof insulated wire 604 which connects the channel unit to its load or to a power output distribution system. Conductive rod 607 is surrounded by a flexible polymer sleeve 603 which, when plug 602 is locked into receptacle 601, is pressurized so that it expands against the inside of the cylinder, rendering the connector waterproof FIG. 7A illustrates a top view of a portion of a channel unit 700 (which, in some embodiments, may be similar to channel unit 1 or 10 of FIG. 4A-4D). Channel unit 700 is arranged to form channel 710 having a width $W_1$. Channel unit 700 comprises molded leading edge caps 702A and 702B with a central molded strip 13 between them forming two inflow channel portions 710A and 710B.

Figure 7B:
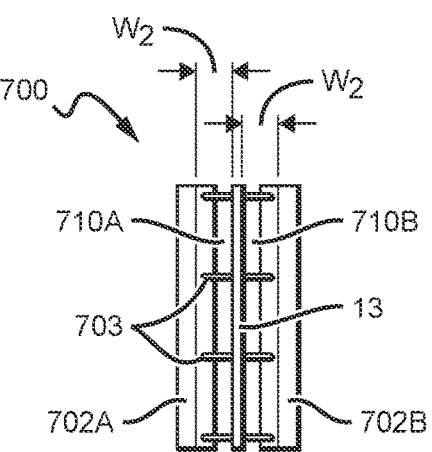
FIG. 7B is a front view of the embodiment of FIG. 7A.

As shown in FIG. 7B (front view, water flowing into page), inflow channel portions 710A and 710B each have a width $W_2$. The elements of channel unit 700 are arranged in the illustrated embodiment such that $W_2 < W_1$ for purposes of blocking any underwater particle in the inflow water—in either direction—that is as large as or larger than the internal channel spacing (in this case, $W_1$) of a channel unit. Any particles filtered by this device which adhere to the upstream surface by the force of current flow will be flushed out whenever the flow reverses (once or twice a day in tidal flows). Also shown in FIG. 7B are molded web supports 703 for supporting molded strip 13.

The embodiment shown in FIGS. 7A and 7B enable the channel unit to provide a venturi to increase fluid velocity through magnetic portions of the channel unit while still preventing clogging due to trapping of debris in the inner channel areas.

Figure 8:
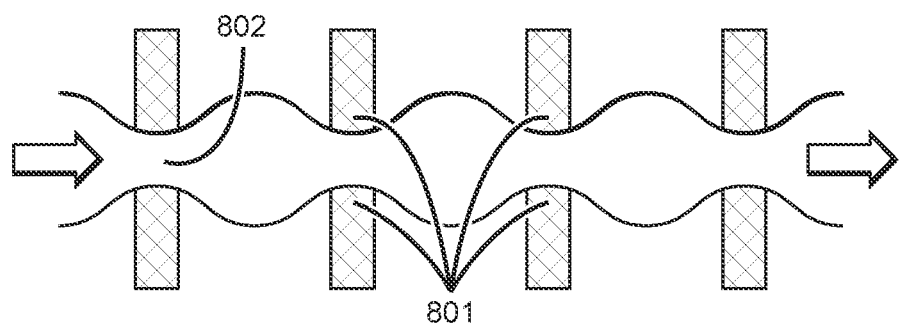
FIG. 8 illustrates a corrugated channel shapes in an embodiment of the invention which provide a wider channel for low flow velocity when the water is not between magnetic poles and a narrower channel for faster flow velocity when the water is between the magnets.

FIG. 8 illustrates a corrugated channel shape which provides a wider channel for low flow velocity when the water is not between the magnetic poles 801 and a narrower channel 802 for faster flow velocity when the water is between the magnets.

Figure 9A:
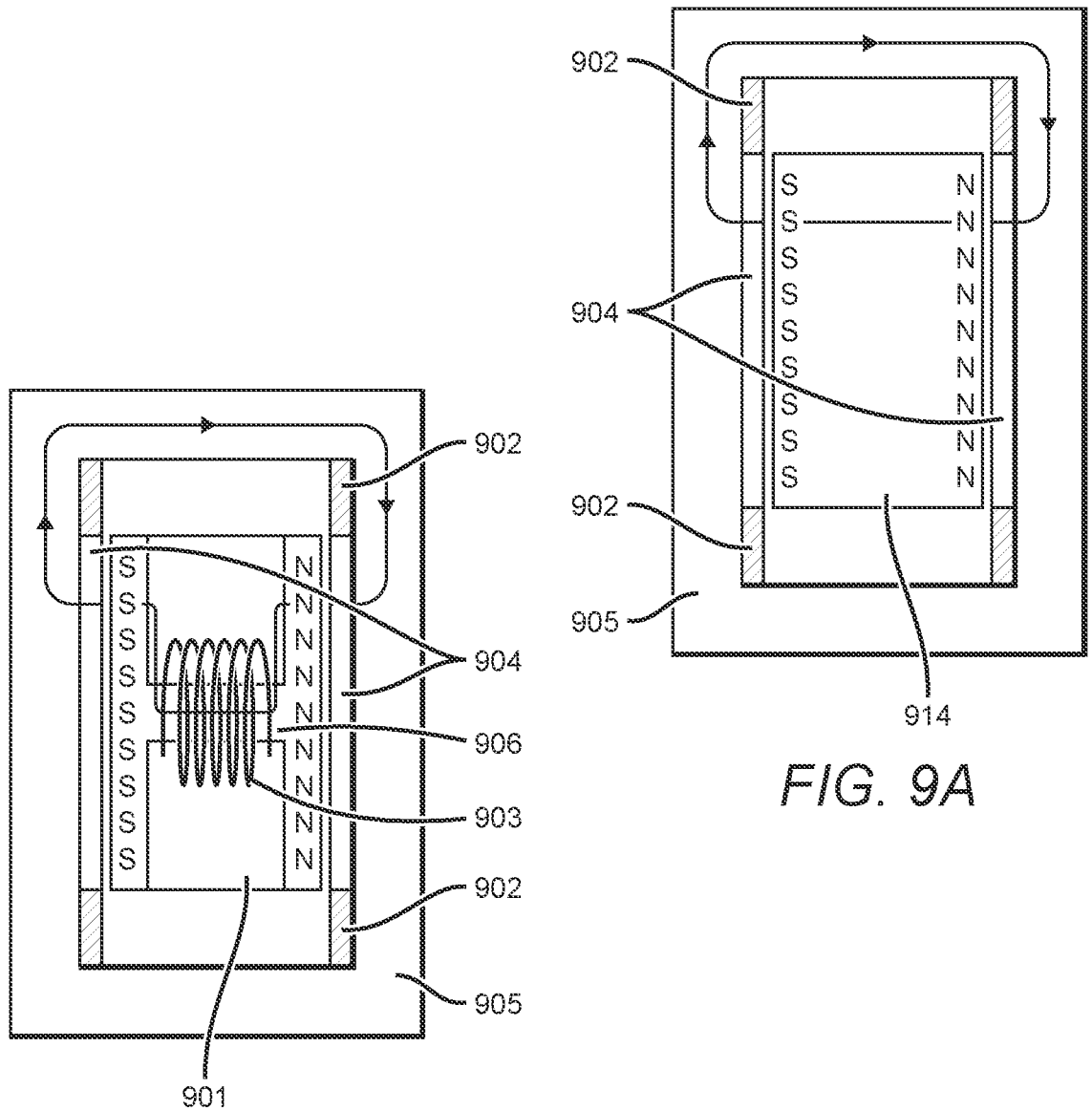
FIG. 9A shows a module embodiment of the invention equipped with a strong permanent magnet surrounded by a ferrous enclosure.

FIG. 9A shows a module embodiment of the invention equipped with a strong permanent magnet 914 surrounded by a ferrous enclosure 905. Electrodes 902 are placed as shown. The illustrated elements are arranged to form two fluid channels 904. Ferrous enclosure 905 is of sufficient permittivity to provide a complete closed magnetic circuit around the magnet 914 and both fluid channels 904, to intensify the magnetic flux passing across the fluid channels 904.

Figure 9B:
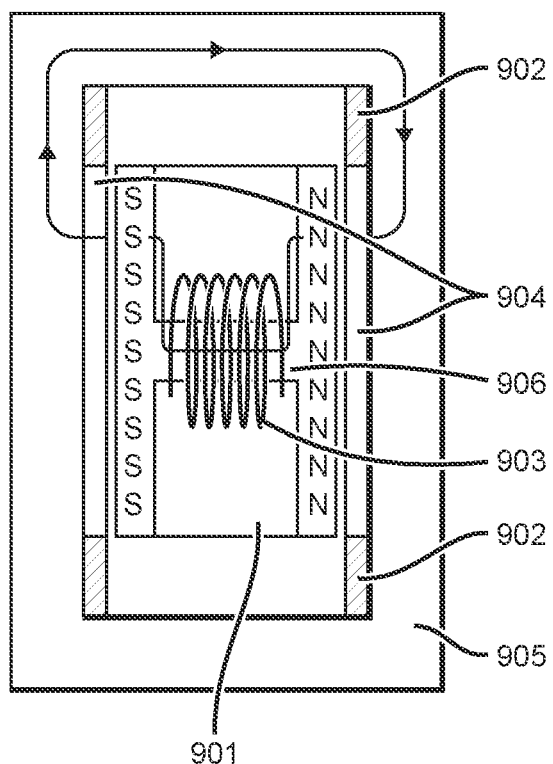
FIG. 9B illustrates an alternative embodiment in which a strong permanent magnet is replaced by a high power electromagnet.

FIG. 9B illustrates an embodiment in which a strong permanent magnet is replaced by a high power electromagnet 901. Electromagnet 901 comprises coil windings 903 around armature 906. Electrodes 902 are placed as shown. The illustrated elements are arranged to form two fluid channels 904. Ferrous enclosure 905 is of sufficient permittivity to provide a complete closed magnetic circuit around the electromagnet 901 and both fluid channels 904, to intensify the magnetic flux passing across the fluid channels 904.

Selected Embodiments

First embodiment: A device or module, for the generation of electrical power in seawater, or in any conductive fluid solution of salts in water, flowing through a magnetic field oriented transversely to the direction of flow.

Second embodiment: A device or module, as described in the first embodiment above, including a single pair of electrodes of a non-corroding electrically conductive metallic or composite material, positioned within the water flow, on an axis transverse to the flow direction and orthogonal to the direction of the magnetic field, to conduct electric current, induced by the motion of the conductive fluid through a magnetic field, to an external load.

Third embodiment: A device, as described in the first embodiment or the second embodiment above, using no venturi or other fluid velocity augmentation means, so as to present no constriction to the fluid flow that could allow objects carried in the fluid to become lodged in the said constriction, thereby causing blockages of the device.

Fourth embodiment: A horizontal and vertical matrix consisting of a plurality of devices or modules, as described in the third embodiment above, assembled edge-to-edge and/or end-to-end to form of a thin screen through which the fluid flows and through which the generated electrical power is conducted.

Fifth embodiment: A matrix, as described in the fourth embodiment above, in which the elemental devices are electrically connected through watertight conductors in series, parallel, or series-parallel to increase the current or voltage output of the individual devices and collect their outputs into a single output connection, designed to withstand fluid drag forces in forward and reverse flow directions.

Sixth embodiment: A mounting system or frame, for the matrix of power generation devices as described in the fifth embodiment above, constructed of rigid members, or else of tensioned flexible cables, attached to anchoring structures, designed to hold the power generation matrix below the surface of the water at all times.

Seventh embodiment: Anchoring structures, as described in the sixth embodiment above, based on foundations on the stream bed, or else on tensioned cables crossing above the stream bed and in turn anchored to points on the stream banks or to vertical structures set into the stream bed, or on any other structures, located on each side of the power generation matrix.

Eighth embodiment: Alternatively, a floating mounting system for the matrix as described in the sixth embodiment above, anchored in a flow-wise direction, of sufficient flow-wise stability, or length, to withstand the forward and reverse moments resulting from fluid-drag-induced downstream forces acting on the power generation matrix.

Ninth embodiment: A matrix, as described in the fifth embodiment above, in which the collected power output of the elemental power generation devices is conducted by an undersea cable to the shore or to a floating support structure.

Tenth embodiment: A device, as described in the second embodiment above, in which the magnetic field is provided by permanent magnets, in which the permanent magnets are coupled magnetically so as to form magnetic circuits that include the passages through which the fluid flows, resulting in a direct current output whose polarity depends on the direction of fluid flow through the device. In a bidirectional tidal power generator, the electrical output is connected to the load through a full wave rectifier bridge or equivalent to maintain a constant output polarity.

Eleventh embodiment: A device, as described in the second embodiment above, in which the magnetic field is internal to the device, having minimal external magnetic effects on marine life or on ferrous objects carried in the fluid flow.

Twelfth embodiment: A device, as described in the tenth embodiment or eleventh embodiment above, in which the magnetic field is alternatively provided by electromagnets, which electromagnets may be excited either by direct current, or else by alternating current so as to provide an alternating output current from the device. The system can be equipped with conventional or superconducting electromagnets.

Thirteenth embodiment: A device, as described in the twelfth embodiment above, in which the magnetic field is self-generated using electromagnets in the power generation device excited initially by small currents induced through residual magnetism within the device as soon as flow commences in either direction, building up automatically to full excitation for as long as the flow continues.

Fourteenth embodiment: An array of devices or modules (i.e. an assembly of a series of modules as described above, transverse to the direction of fluid flow, in which each adjacent module shares one of its magnet poles with its neighbor) consisting of a number of identical single-magnet modules bound together and surrounded by a ferrous band serving to complete the magnetic circuits of all the modules in the array. A single magnet section without fluid channel is inserted at the end of the cascade to complete the magnetic field through the last fluid channel.

Any number of cascades as described in the fourteenth embodiment above can be assembled side-by-side and end-to-end to form a two-dimensional matrix as described in the fourth embodiment above and subsequently, with structural support and electrical interconnections as appropriate to the size of the matrix and to the drag forces induced by the fluid flow.

What is claimed is:

1. A power generating apparatus comprising:
a plurality of channel walls, each channel wall of the plurality of channel walls comprising a magnet, the plurality of channel walls thus collectively comprising a plurality of magnets, the plurality of channel walls being mounted on a supporting structure to form a plurality of fluid channels configured to permit seawater to flow through the plurality of fluid channels when the power generating apparatus is placed in flowing seawater, wherein a channel wall of the plurality of channel walls separates two fluid channels of the plurality of fluid channels, the two fluid channels being on either side of the channel wall;
a plurality of electrodes arranged within borders of the plurality of fluid channels; and
electrical connections between the electrodes conveying electricity to power output lines connected to the power generating apparatus.

2. The power generating apparatus of claim 1 wherein the plurality of channel walls form each fluid channel of the plurality of fluid channels as a venturi to increase fluid velocity in the fluid channel in the vicinity of the magnetic field.

3. The power generating apparatus of claim 2 further comprising a molded structure to divide an inflow region of the fluid channel into sub channel portions each sub channel portion being narrower in width than a width of the venturi in the vicinity of the magnetic field, thereby minimizing the ability of debris in the flowing seawater to clog the fluid channel.

4. The power generating apparatus of claim 1 wherein the plurality of magnets comprise permanent magnets.

5. The power generating apparatus of claim 1 wherein the plurality of magnets comprise electromagnets.

6. The power generating apparatus of claim 2 wherein the plurality of magnets comprise permanent magnets.

7. The power generating apparatus of claim 3 wherein the plurality of magnets comprise permanent magnets.

8. The power generating apparatus of claim 2 wherein the plurality of magnets comprise electromagnets.

9. The power generating apparatus of claim 3 wherein the plurality of magnets comprise electromagnets.

10. The power generating apparatus of claim 1 wherein the plurality of magnets are arranged such that, for each fluid channel of the plurality of fluid channels, a side of a first magnet on a first side of a channel has a first polarity and faces a side of a second magnet on a second side of the channel, the side of the second magnet having a second polarity opposite of the first polarity.

* * * * *